United States Patent [19]

Rusu

[11] 4,314,169
[45] Feb. 2, 1982

[54] MAGNETIC MOTOR

[75] Inventor: John Rusu, Surfside, Fla.

[73] Assignee: Electro-Magnetic Motors Inc., San Juan, P.R.

[21] Appl. No.: 131,520

[22] Filed: Mar. 18, 1980

[51] Int. Cl.³ .......................................... H02K 37/00
[52] U.S. Cl. .................................................... 310/46
[58] Field of Search ............................................ 310/46

[56] References Cited

U.S. PATENT DOCUMENTS 3,396,296  8/1968  Esters ............................. 310/46 X

*Primary Examiner*—Donovan F. Duggan
*Attorney, Agent, or Firm*—Scrivener, Clarke, Scrivener and Johnson

[57] ABSTRACT

The disclosure is of a machine for producing the rotary motion of a shaft by causing two permanent magnets carried by the shaft to pass in close proximity to the poles of an electromagnetic coil as the shaft is rotated, with poles of the same polarity of the permanent magnets and the coil adjacent, and energizing the coil during passage of the permanent magnets past the poles of the coil while maintaining the coil otherwise de-energized.

2 Claims, 3 Drawing Figures

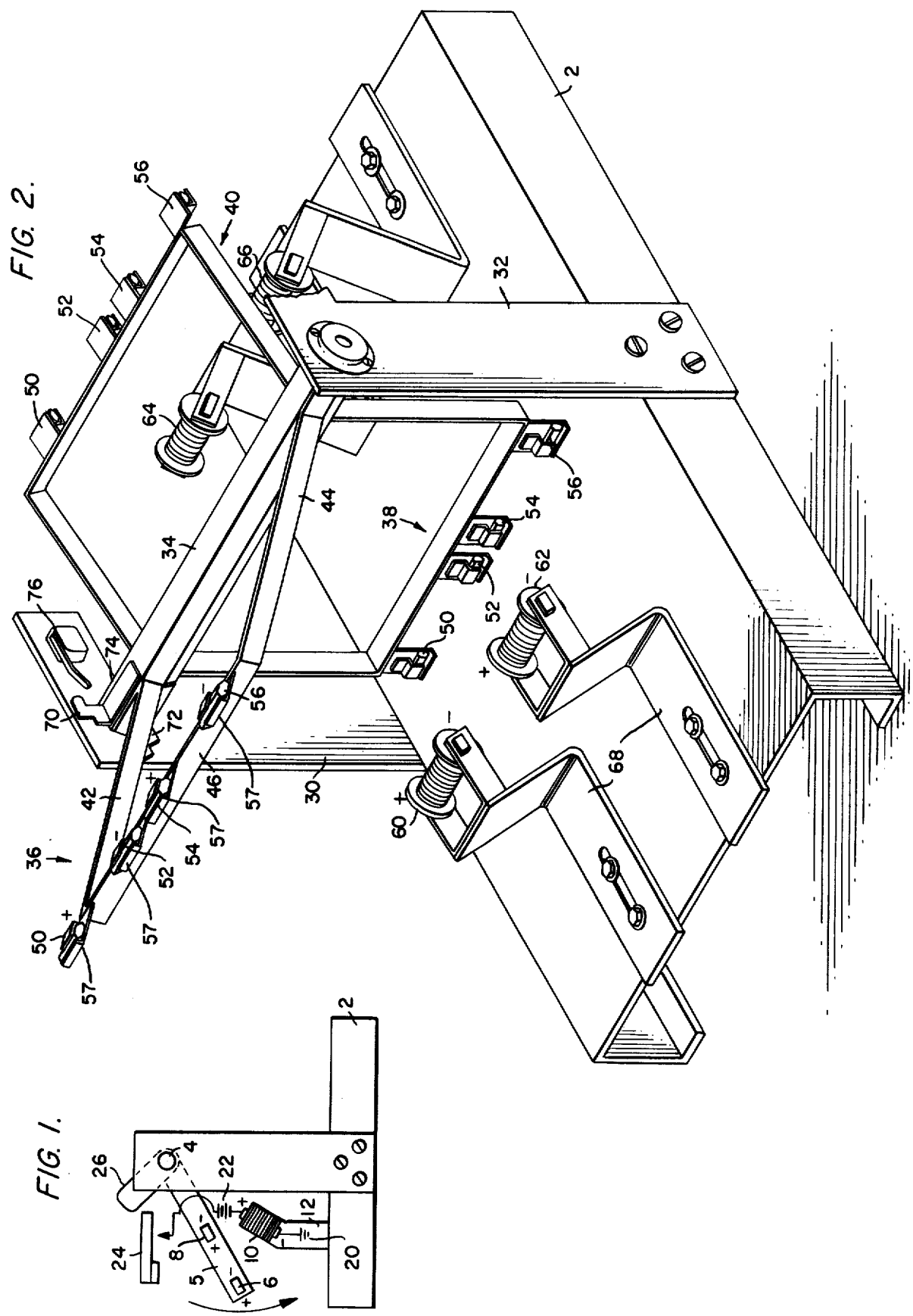

MAGNETIC MOTOR

SUMMARY OF THE INVENTION

The disclosure is of an electromagnetic motor in which a plurality of electromagnetic coils are positioned adjacent the shaft and a plurality of pairs of permanent magnets are mounted on the shaft, each pair being positioned to pass successively past a coil with a pole of each permanent magnet adjacent the pole of the same polarity of the coil, each coil being energized to produce a magnetic field during movement of a pair of permanent magnets past the coil.

DESCRIPTION OF THE DRAWINGS

FIG. 1 is a diagrammatic view of a machine according to the invention, showing the circuit for energizing each electromagnetic coil;

FIG. 2 is a perspective view of a preferred embodiment of the machine, and

DESCRIPTION OF THE INVENTION

Figure 3:
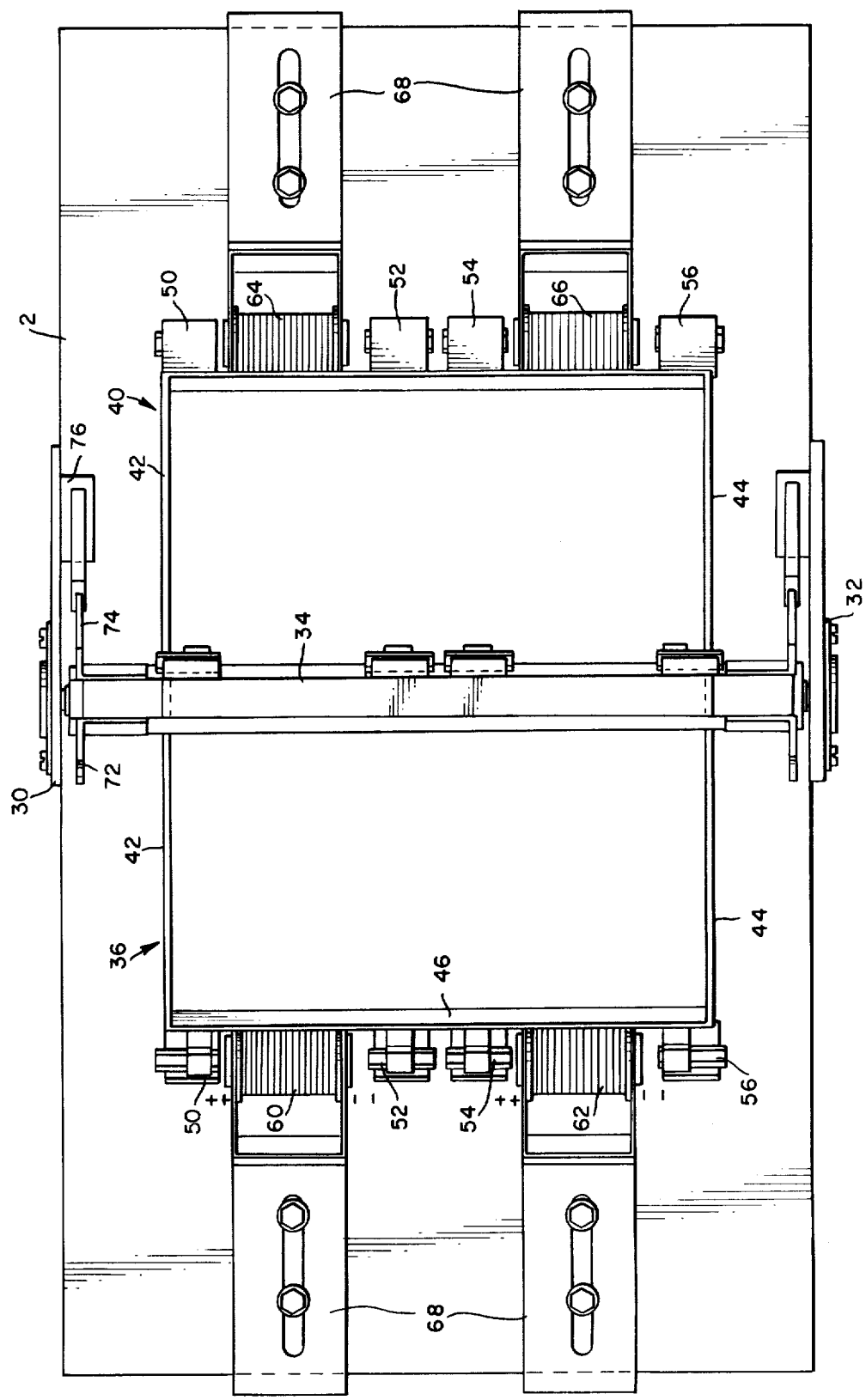
FIG. 3 is a top elevational view of the machine of FIG. 2.

In the part-elevational and part-schematic view of FIG. 1 of the drawings there is illustrated the mode of operation of a machine according to the invention. The machine comprises a base 2 supporting a shaft 4 for rotary movement. An arm 5 is mounted on the shaft and extends radially outwardly from it and adjacent its outer end carries two permanent magnets 6, 8 each having positive and negative poles as indicated in the drawing. An electromagnetic coil 10 is mounted on the base 2 by bracket 12 in such a position that the poles of the permanent magnets will pass closely adjacent the poles of the coil as the shaft 4 and arm 5 are rotated, the arrangement being such that poles of like polarity of the permanent magnet and coil will be adjacent when the passage occurs, as shown in FIG. 1.

Means are provided by the invention for energizing the coil 10 to produce a magnetic field about it as the poles of the permanent magnet pass the poles of the coil. In the disclosed form of the invention such means comprise an electric circuit including ground at 20 connected to one terminal of coil 10, a source of energy 22, which may be a battery of wall plug, a normally open switch 24, and cam means 26 carried by shaft 4 for closing the switch when the poles of the permanent magnet are adjacent the coil in the rotary movement of the shaft 4 and arm 5.

It will be understood from this disclosure of the basic principle of operation of the invention that as the permanent magnets pass the coil direct current electric energy is momentarily supplied to the coil, charging it and creating a magnetic field about it, the polarity of which is such that the adjacent poles of the fields of the permanent magnet and the coil are of the same polarity, thus producing mutually repulsive forces having a propulsive effect on arm 5 and the rotary system of which it forms a part, causing the shaft to rotate.

A preferred embodiment of a machine according to the invention utilizing the principle illustrated in FIG. 1 is disclosed in FIGS. 2 and 3 of the drawings. This machine comprises a base 2 having upright standards 30, 32 which support a shaft 34 for rotary motion. A plurality of rectangular open brackets 36, 38, 40 extend radially outwardly from the shaft and are equidistantly spaced about it, adjacent brackets being separated by 120°. Each bracket comprises spaced radial arms 42, 44 and transverse arm 46 which connects the outer ends of the two radial arms and is parallel to the shaft. Two pairs of permanent magnets 50, 52 and 54 and 56 are connected to each transverse arm 46, and each magnet is supported on the arm by a bracket 57 formed of non-magnetic material. The spacing of the magnets of each pair and the positions of their poles will be described.

Two pairs of electromagnetic coils 60, 62 and 64, 66 are mounted on the upper surface of base 2 at opposite sides of the shaft 4, and in the disclosed embodiment the axes of all of the coils are parallel to the shaft, and the axes of the coils of each pair are aligned. A suitable bracket 68 is provided for supporting each coil for adjustment toward and away from the shaft and vertically with respect to the base and is made of non-magnetic material. The polarity of the poles of each coil is shown in FIG. 2.

The permanent magnets of each pair of such magnets are so positioned on their supporting bracket that as the assembly of shaft, brackets and permanent magnets revolves the poles of the permanent magnets of each pair successively pass closely to the poles of the electromagnetic coils. Thus, the poles of the permanent magnets 50, 52 successively pass the poles of coils 60 and 64 the poles of permanent magnets 54, 56 successfively pass the poles of coils 62 and 66.

In accordance with the invention the poles of the permanent magnets and those of the electromagnetic coils are so positioned that poles of the same polarity are adjacent as the permanent magnets pass the electromagnetic coils. Thus, positive poles are adjacent in passing and negative poles are adjacent, and this relation is disclosed in the drawings.

In further accordance with the invention, and as described in connection with FIG. 1, each electromagnetic coil is energized by direct current during the short interval while the permanent magnets are passing it. The circuitry and switch means for effecting this are disclosed in FIG. 1 and described in connection with that figure and need not be repeated in connection with FIGS. 2 and 3. However, in the embodiment disclosed in those figures three radial brackets are carried by the shaft, and therefore each coil must be energized three times during a complete rotation of the rotary assembly. Therefore, in the disclosed embodiment, three cams 70, 72, 74 are mounted on each end of shaft 34 and are angularly spaced equally to the spacing of the three brackets which support the permanent magnets, i.e. approximately 120°. A switch 76 is carried by bracket 30 in position to be operated by the cams as the shaft and cams are rotated, and operation of the switch completes the circuit energizing coil 60 or 64 as the permanent magnets 50, 52 pass one or the other of those coils. Three similar additional cams are mounted on the other end of shaft 34 and operate a second switch during rotation of the shaft to energize coil 62 or coil 66 when the permanent magnets 54, 56 pass the ends of one or the other of these coils. It will be understood that these latter cams and switches are exactly similar to cams 70, 72, 74 and switch 76 and operate in the same manner, and are shown in FIG. 3.

I have found that best results are obtained if energization of any one of the electromagnetic coils is continued only while the pair of permanent magnets which cooperates with the coil is moving through an arc of approximately 20°. The inertia of the rotating assembly continues its motion until a pair of permanent magnets next reaches a coil. It will also be observed that by mounting the permanent magnets substantially outwardly of the shaft the repulsive forces created by the reaction of the like poles of the permanent magnets and electromagnetic coils as they pass operates through the leverage of the arms 42, 44 of each of the brackets 36, 38, 40 thus increasing the force exerted on the shaft and producing a smoother operation.

I claim:

1. An electromagnetic motor comprising:
   a. a fixed base,
   b. an elongated shaft rotatably mounted on the base,
   c. a plurality of brackets mounted in spaced circumferential relation on the shaft, each bracket comprising radial arms of the same length mounted in spaced relation on the shaft, and a transverse arm mounted on the ends of the radial arms and parallel to and spaced from the shaft,
   d. a pair of permanent magnets mounted on each transverse arm of each bracket in spaced relation along the transverse arm, with the magnets mounted on the brackets being circumferentially and radially aligned about the shaft,
   e. a plurality of electromagnetic coils mounted on the base in surrounding relation to the shaft with the axis of each coil parallel to the shaft,
   f. the permanent magnets of each pair and the electromagnetic coils being so constructed and positioned that on rotation of the shaft the permanent magnets of each pair pass in close proximity to the ends of each electromagnetic coil,
   g. means normally maintaining each coil deenergized, and
   h. means for so energizing each coil during passage by it of a pair of permanent magnets that each pole of each pair of permanent magnets passes adjacent a pole of the same polarity as it passes each coil.

2. A motor according to claim 1, in which each coil is energized during movement of each pair of permanent magnets passed it through an arc of approximately 20 degrees.

* * * * *